(12) United States Patent
Zollinger et al.

(10) Patent No.: US 12,484,914 B2
(45) Date of Patent: Dec. 2, 2025

(54) DENTAL DRILL SURFACE TREATMENT

(71) Applicant: STRAUMANN HOLDING AG, Basel (CH)

(72) Inventors: Simon Zollinger, Basel (CH); Sven Schneider, Basel (CH)

(73) Assignee: STRAUMANN HOLDING AG, Basel (CH)

( * ) Notice: Subject to any disclaimer, the term of this patent is extended or adjusted under 35 U.S.C. 154(b) by 803 days.

(21) Appl. No.: 17/435,425

(22) PCT Filed: Mar. 6, 2020

(86) PCT No.: PCT/EP2020/056059
§ 371 (c)(1),
(2) Date: Sep. 1, 2021

(87) PCT Pub. No.: WO2020/182673
PCT Pub. Date: Sep. 17, 2020

(65) Prior Publication Data
US 2022/0125552 A1    Apr. 28, 2022

(30) Foreign Application Priority Data

Mar. 8, 2019 (EP) .................................... 19161532

(51) Int. Cl.
*A61B 17/16* (2006.01)
*A61B 90/92* (2016.01)
(Continued)

(52) U.S. Cl.
CPC ............ *A61B 17/1673* (2013.01); *C23F 1/28* (2013.01); *C25F 3/24* (2013.01); *A61B 90/92* (2016.02)

(58) Field of Classification Search
CPC ................. C25F 3/24; C25F 3/06; C23F 1/28
See application file for complete search history.

(56) References Cited

U.S. PATENT DOCUMENTS 2,105,968 A * 1/1938 Castle .................. C21D 8/0278
420/101
2,105,969 A * 1/1938 Castle .................. C21D 8/0278
29/17.6

(Continued)

FOREIGN PATENT DOCUMENTS

CN    104726874 A    6/2015
EP    1386985 A1    2/2004
(Continued)

OTHER PUBLICATIONS

WO 2016030506 A1 and translation (Year: 2016).*
(Continued)

*Primary Examiner* — Brian W Cohen
(74) *Attorney, Agent, or Firm* — Oliff PLC

(57) ABSTRACT

A method of surface treating a drill, the drill including a shaft extending along a central longitudinal axis from a proximal end to a distal end, the proximal end of the shaft including a shank adapted for connection to a rotary driver, the shaft further including, distal of the shank, a fluted section including at least one flute extending along the longitudinal length of the fluted section, the method including the steps of: acid etching at least a portion of the fluted section of the shaft in order to create a visible matted effect, subsequently electro-polishing at least the portion of the fluted section of the shaft in order to visibly reduce the matted effect and subsequently creating one or more visual marking within the portion of the fluted section of the shaft.

17 Claims, 4 Drawing Sheets

(51) Int. Cl.
C23F 1/28 (2006.01)
C25F 3/24 (2006.01)

(56) References Cited

U.S. PATENT DOCUMENTS

| | | |
|---|---|---|
| 2002/0028422 A1 | 3/2002 | Kumar |
| 2005/0069837 A1 | 3/2005 | Lewis et al. |
| 2007/0181230 A1* | 8/2007 | Dessis .................... C23G 3/021 |
| | | 148/575 |
| 2013/0292188 A1 | 11/2013 | Bilen et al. |
| 2019/0055663 A1* | 2/2019 | Reichert ................. C25D 5/14 |
| 2022/0002896 A1* | 1/2022 | Bayer ...................... B24C 1/06 |

FOREIGN PATENT DOCUMENTS

| | | | | |
|---|---|---|---|---|
| EP | 3272913 A1 * | 1/2018 | .............. | C21D 7/06 |
| FR | 2971140 A1 | 8/2012 | | |
| KR | 101064595 B1 | 9/2011 | | |
| KR | 20180107422 A | 10/2018 | | |
| WO | 01/085051 A2 | 11/2001 | | |

OTHER PUBLICATIONS

May 13, 2020 International Search Report issued in International Patent Application No. PCT/EP2020/056059.
May 13, 2020 Written Opinion issued in International Patent Application No. PCT/EP2020/056059.

* cited by examiner

DENTAL DRILL SURFACE TREATMENT

The present invention relates to a surface treatment method and the resulting surface of a dental surgical drill for drilling into the human jawbone.

Dental implants are used to replace individual teeth or for anchoring more complex structures, which generally replace several or even all of the teeth. The implants are inserted into the jaw bone, where they osseointegrate with the bone to provide a firm anchor for a prosthesis.

During placement of a dental implant, drills are used to drill into the jaw bone of the patient. In order to avoid damage to the surrounding bone tissue it is very important to prevent the drills from overheating the bone tissue. For this reason it is desirable to minimise the friction generated between the drill and the bone during use and to ensure a good bone chip transport away from the drill site.

Another important requirement of dental drills is that the drills enable the surgeon to accurately drill the bore hole to a particular depth. This is important both for correct implant seating within the bone and also to prevent damage to nerves and—other structures within the jaw. Many dental drills therefore have one or more depth marking on the drill shaft, in order to assist the surgeon during drilling of the bore hole. Most drills are made of metal, such as stainless steel, which have a high reflectivity. During a surgical operation, which occurs under bright lights, reflections from the drill surface can reduce the surgeon's visibility of the depth markings, making it harder to determine when the correct depth has been reached. In order to improve the visibility of depth markings, drill surfaces are often treated in a manner which reduces the light reflection, e.g. acid etching. Acid etching increases the surface roughness of the drills and thus increases the scattering of light, which in turn reduces glare and increases the visibility of the depth marking(s). However, such roughening has a negative effect on the heat generated by the drills, due to increased friction.

EP1284677 discloses a method of providing a drill with a hard carbon coating and laser etching this coating in order to provide depth markings. Such a coating is said to reduce the friction and corrosion of the drill. As this coating is dark in colour, it will also reduce the light reflectivity of the drill. However, the application of this coating increases the cost and complexity of the production process. In addition, there is a risk of delamination of the coating during use, which could result in particles of the coating remaining in the mouth and associated biocompatibility risks.

It is therefore an aim of at least a preferred embodiment of the present invention to provide a dental drill having optimised light reflection and friction properties, while maintaining a simple and cost effective production procedure.

According to one aspect, the present invention provides a method of surface treating a drill, said drill comprising a shaft extending along a central longitudinal axis from a proximal end to a distal end, the proximal end of the shaft comprising a shank adapted for connection to a rotary driver, the shaft further comprising, distal of the shank, a fluted section comprising at least one flute extending along the longitudinal length of the fluted section, the method comprising the steps of: acid etching at least a portion of the fluted section of the shaft in order to create a visible matted effect, subsequently electro-polishing at least said portion of the fluted section of the shaft in order to visibly reduce the matted effect and subsequently creating one or more visual marking within said portion of the fluted section of the shaft.

As known from prior art methods, the acid etching procedure increases the visibility of the later added visual marking(s) by reducing the reflectivity of the drill in the vicinity of these markings. The acid etching treatment removes material from the drill surface in a non-uniform manner, resulting in series of microscopic peaks and troughs. This roughened surface is visible to the naked eye as a duller or darker area of the drill, as the roughened surface increases the light scattering effect. As well as improving the light scattering of the drill however, a roughened acid etched surface also increases the friction created by the drill in use. However, drills manufactured according to the inventive method show a reduction in heat generation over drills which are simply acid etched. This occurs due to a reduction in the surface roughness of the drills, caused by the later electro-polishing step.

Electro-polishing removes material from the drill surface due to the application of a voltage over the drill surface. The voltage is felt most strongly on the peaks of the drill surface and hence these areas are dissolved first, leading to a smoother surface. On the other hand, the electro-polishing procedure does not remove the roughness to such an extent that the roughness caused by the acid etching is removed altogether.

Therefore, acid etching followed by electro-polishing enables the drills to exhibit both a good visibility of visual markings as well as low heat generation during use.

According to the present invention, the surface of the drill is visibly altered first by the acid etching step, and then again by the electro-polishing step. The end result is that the portion of drill which has been both acid etched and electro-polished has a surface which is visually distinct from a portion which has been purely acid etched or purely electro-polished or left untreated. The electro-polishing step smooths the micro-roughness caused by the acid-etching but not to such an extent that this is removed entirely. In this way the surface still results in a better light scattering effect than a non-treated surface, and hence provides for better visibility of the visual markings, while being smoother than a purely acid-etched surface, hence resulting in lower friction and heat generation.

Therefore, following the method of the present invention, the surface of the drill will look visibly different after the acid etching step and then again after the electro-polishing step. By visually different it is meant that a difference in the appearance of the drill surface can be detected by the naked eye under normal white light conditions.

Preferably, after the step of electro-polishing, the surface roughness Sa (arithmetical mean height) of the portion of the drill which has been acid etched and electro-polished is between 0.1 and 0.2 µm, more preferably between 0.13 and 0.18 µm and the surface roughness Sz (maximum height) of the portion of the drill which has been acid etched and electro-polished is between 1.0 and 2.5 µm, more preferably between 1.5 and 2.3 µm.

As the electro-polishing step partially smooths the roughening caused by the acid etching step, in the above preferred embodiment the surface of the drill after acid etching but before electro-polishing will have a greater roughness than the above values.

Preferably, after the step of acid etching but prior to the step of electro-polishing, the surface roughness Sa (arithmetical mean height) of the portion of the drill which has been acid etched is between 0.2 and 0.3 µm and the surface roughness Sz (maximum height) of the portion of the drill which has been acid etched is between 2.5 and 4.0 µm.

According to the present invention the fluted section of the drill comprises at least one flute extending the full length of the fluted section. Preferably the fluted section comprises a plurality of such flutes, most preferably between 2 and 4 flutes. Preferably the at least one flute extends along the fluted section in a helical manner, which is beneficial for chip transport. However, in other embodiments the flute(s) may be straight. The fluted section can have any shape known in the art. The present invention is not limited to any specific geometry of the fluted section or other sections of the drill but instead is concerned only with the herein described surface treatment steps applied to the drill and the resulting surface structuring.

According to the present invention at least a portion of the fluted section is first acid etched and then electro-polished. The smoothing of the flute surface caused by the electro-polishing allows smoother transport of bone chips out of the bore hole during drilling than would be achieved by a purely acid etched flute. Rapid transport of the bone chips away from the drilling site assists in the prevention of friction and heat build up.

The smoothing of the area of the drill surface interposing the flute(s), known as lands, is also beneficial in preventing friction, in this case between the drill and the surface of the bore hole. During use the lands will at least partially contact the surface of the bore hole. While this contact can be reduced by including clearance surfaces in the fluted section, some contact with the bore wall is necessary in order to stabilize the drill. The roughened surface produced by acid etching increases the friction between the bore surface and the lands, whereas the electro-polishing step reduces this roughness and hence decreases the friction and heat generation, while at the same time maintaining an improvement in the visibility of the visual marking(s) compared to an non-acid-etched surface.

According to the present invention the one or more visual marking is added to the fluted section after the steps of acid etching and electro-polishing. This is so that the visibility of the marking is not reduced by the surface changes caused by these earlier procedures. Acid etching and electro-polishing both partially remove the outer surface of the drill, and hence would also remove any visual marking made on this surface. It is thus advantageous to finalise the surface roughening and smoothing treatment prior to adding the at least one visual marking.

The one or more visual marking can be any mark on the fluted section which is visually detectable to the human eye under normal working conditions, i.e. in white light and at a distance within an arm's length of the observer. Such a visual marking is thus observable by the dentist or surgeon during normal working conditions and use of the drill.

The one or more visual marking could for example be painted on the fluted section, or formed by a circumferential groove in the shaft surface. In such cases the marking is visually detectable due to the difference in colour or depth respectively from its surroundings. Preferably however the one or more visual marking is formed by laser marking. This process is well known and simple to perform. The laser marked area of the drill surface is darker in colour than the surrounding shaft, making this easily visually detectable to the human eye. The laser marking can be performed on the exterior surface of the drill shaft or within a circumferential groove or indent formed in the exterior surface. Preferably the one or more visual marking is formed by laser marking the exterior surface of the drill shaft, as this reduces the complexity of manufacture. In this context, by "exterior surface" it is meant the external surface of the drill inclusive of all drill geometry features necessary for the cutting function and efficacy of the drill, e.g. lands, flutes, clearance surfaces etc. In other words, the visual marking is placed on this surface, without any requirement for additional surface features, such as grooves or indents, to be added.

Preferably the one or more visual marking extends circumferentially about the shaft. This improves the visibility of the marking during rotation of the drill. The visual marking could extend only partially about the shaft, e.g. only on the lands, or it may be discontinuous about the shaft circumference, such that the visual marking forms a broken line. However, preferably the one or more visual marking extends in a continuous manner about the full circumference of the shaft. This simplifies production and increases visibility of the marking. Preferably the one or more visual marking extends circumferentially about the shaft in a plane perpendicular to the central longitudinal axis of the shaft. This is particularly beneficial when the marking is intended to serve as a depth indicator marking.

According to the present invention the method involves creating one or more visual marking within a portion of the fluted section which has been both acid etched and subsequently electro-polished. This is necessary in order to ensure that the visibility of the visual marking is increased by the inventive surface treatment method. By "within" it is meant that the visual marking has an axial length less than the portion of the fluted section which has been both acid etched and electro-polished, such that this portion extends at least distally or proximally of the visual marking. Preferably, in order to provide the optimum visibility, the portion extends both distally and proximally of the visual marking(s).

Preferably a plurality of visual markings are formed at discrete axial distances from one another within one or more portions of the fluted section which have been acid etched and subsequently electro-polished. In this way the visual markings can be used to indicate different depths of the drill. When the visual markings are intended for use as distance indicators it is preferable, as mentioned above, that each visual marking extends circumferentially about the shaft in a plane perpendicular to the central longitudinal axis of the shaft. Preferably the method comprises the step of creating at least 4 visual markings, more preferably between 4 and 10 visual markings, wherein said markings are located within one or more portion of the fluted section which has been acid etched and subsequently electro-polished. These markings may all have the same axial length. In preferred embodiments however, at least one marking has an axial length greater than another of the visual markings. This difference in the length of the markings makes it easier for the surgeon to quickly distinguish the length that each marker is indicating. In a particularly preferred embodiment the method comprises the step of creating a plurality of visual markings axially spaced from one another, all but one of said visual markings having equal axial lengths, the other of the visual markings having an axial length greater than the other visual markings, the plurality of visual markings being created within one or more portion of the fluted section which has been acid etched and subsequently electro-polished.

In an alternative particularly preferred embodiment the method comprises the step of creating a plurality of visual markings axially spaced from one another, all but two of said visual markings having equal axial lengths, the other two of the visual markings having a different axial length greater than the other visual markings, the plurality of visual markings being created within one or more portion of the fluted section which has been acid etched and subsequently electro-polished.

It is to be noted that the drill may comprise additional visual markings in areas of the drill other than the fluted section. For example, the drill may comprise, proximal of the fluted section, markings indicating the diameter, length or product number of the drill. These markings may be formed by the same or an alternative method as the one or more visual marking within the fluted section. However, when these additional markings are located in areas of the drill which do not contact the bore hole, or assist with bone chip transport, the surface roughness of the drill in these areas is of less concern. Further it may not be necessary to refer to these additional markings during operation of the drill, such that surface reflectivity in the area of such markings is also of less concern. Therefore these additional markings may be located on portions of the drill which have not been acid etched and/or electropolished. The method of the present invention is therefore solely concerned with visual markings formed within the fluted section of the drill.

According to the present invention, at least the portion of the fluted section that will later comprise one or more visual marking is acid etched and electro-polished. Only the portion(s) of the fluted section which will comprise visual markings must undergo the claimed surface treatment, as the reflectivity of other parts of the fluted section is not problematic. Therefore, in some embodiments, portions, e.g. the distal most end, of the fluted section may not undergo acid etching, thus enabling these portions of the drill to be as smooth as possible. In one embodiment, discrete portions of the fluted section may be acid etched and subsequently electro-polished such that, when a plurality of visual markings are present, one or several markings are located within discrete acid etched and electro-polished portions of the fluted section. However, in preferred embodiments at least the entire fluted section is acid etched and subsequently electro-polished. This eases the manufacturing process and thus reduces costs.

Other sections of the drill may also undergo acid etching and/or electro-polishing. According to one embodiment the step of acid etching is carried out over the fluted section only and the electro-polishing over the full length of the drill. In other preferred embodiments the step of acid etching is carried out from the distal tip of the drill to a point proximal of the fluted section but distal of the shank while the subsequent electro-polishing step is carried out over the full length of the drill. In other embodiments the step of acid etching may be carried out over a greater length of the drill than the electro-polishing, e.g. over parts of the drill shaft proximal of the fluted section.

The step of acid etching can be carried out according to any known process. The acid used can be one of sulphuric, hydrochloric, hydrofluoric, nitric acid etc. Preferably the acid etching occurs at or near room temperature, e.g. between 22-27° C. Preferably the drills are immersed in the acid for at least 3 minutes. During acid etching, one or more parts of the drill can be masked, in order to selectively acid etch only parts of the drill, as discussed above.

As a result of the acid etching treatment, the surface of the drills, in the area(s) where the acid etching occurred, will be roughened and thus take on a matted appearance in comparison to the pre-acid-etched surface. After the acid etching process the drills can be visually inspected to ascertain whether the surface has obtained the desired matted effect. As discussed above, in certain embodiments the desired surface roughness Sa of the surface after the acid etching step is between 0.2 and 0.3 μm and the desired Sz value is between 2.5 and 4 μm. A skilled person, knowing the desired matted appearance and/or surface roughness measurement, will be able to choose the parameters of the acid etching step accordingly in order to achieve the desired outcome.

After the acid etching step the drills are preferably rinsed to remove the acid, this rinsing preferably taking place in multiple stages, e.g. between 2-5 stages, at least one of these stages involving agitation of the drills, e.g. manually and/or ultrasonically.

In a subsequent step, according to the present invention, at least the portion of the fluted section which was acid etched is electro-polished.

Electro-polishing refers to a process whereby an object is immersed in an electrolyte bath and connected to a DC power supply, such that the object forms the anode. The cathode is also placed in the bath and a current passed from anode to cathode. This results in the oxidation and dissolution of metal on the surface of the object. Due to increased current density at corners and edges, metal is dissolved faster at the protruding parts of the object, thus smoothing this. This particular aspect of electro-polishing is known as anodic levelling.

Numerous commercial electro-polishing methods are known which can be applied to the dental drills described herein. The parameters of the electro-polishing step are chosen such that the matting effect caused by the previous acid-etching step is visibly reduced, but not removed. In this way the improved light scattering qualities of the matted surface are partially retained while at the same time reducing the friction created during use by reducing the surface roughness. As discussed above, the surface roughness Sa of the drill, in those areas which have been both acid etched and electro-polished, is preferably between 0.1 and 0.2 μm and the Sz value is preferably between 1 and 2.5 μm. This produces a surface smooth enough to limit temperature increases due to friction and poor chip transport, while at the same time providing a light scattering effect which increases the visibility of the depth markings.

Following the electro-polishing step at least one visual marking is created within the portion of the fluted section which has undergone acid etching and electro-polishing. As discussed above, the creation of the at least one visual marking is preferably achieved by laser marking.

After the step of producing the at least one visual marking the method may comprise further, optional steps, such as passivation.

According to the present invention, the steps of acid etching, electro-polishing and creating at least one visual marking are carried out in this order. The acid etching must occur prior to the electro-polishing step, so that the electro-polishing step has the effect of partially smoothing the roughening caused by the acid etching. Similarly, as discussed above, the visual marking(s) must by created after both the acid etching and electro-polishing step in order to avoid that either of these steps removes or partially removes the marking(s). Although the steps must be carried out in the claimed order, it is not essential that these steps are carried out consecutively. Other production or surface treatment steps, such as the above described rinsing steps, or grinding, can be carried out in between the claimed method steps.

According to the present invention the drill comprises a shank adapted for connection to a rotary driver. The shank can be any known shape which enables the drill to be rotationally and axially fixed to a drive tool, e.g. dental handpiece, ratchet etc. For example, the shank may comprise one or more bevel extending in the longitudinal direction and a groove extending at least partially about the circumference of the shank. Alternatively the shank may comprise a section having a polygonal cross-section, in a plane perpendicular to the central longitudinal axis.

According to the present invention, the fluted section is located distal of the shank. In many embodiments the fluted section preferably extends from the distal end of the drill towards the shank.

Preferably the fluted section further comprises at least one cutting edge. The at least one cutting edge is preferably located at the leading edge of the at least one flute and may extend fully or partially along the length of the flute.

In embodiments in which the fluted section comprises a plurality of flutes the fluted section preferably comprises an equal number of cutting edges, each cutting edge associated with a flute.

When the fluted section extends from the distal end of the drill the at least one cutting edge is preferably located at the distal end of the drill. In such embodiments the fluted section comprises, at its distal end, a drill tip comprising at least one cutting edge. Preferably the drill tip comprises at least one drill flank that tapers radially inwards in the distal direction, the at least one cutting edge being located on the drill flank. In other embodiments however the drill tip may be perpendicular to the central longitudinal axis of the drill, or curved over a radius. Providing at least one cutting edge on the drill tip is necessary when the drill will be used to add length or width to a bore hole. In addition the at least one cutting edge can extend longitudinally along the fluted section proximal of the drill tip. However, it is not necessary for the at least one cutting edge to extend along the full length of the fluted section. Instead, it is often preferable for the cutting edge to be blunted along the proximal length of the fluted section in order to reduce the friction generated during use of the drill.

In some embodiments the fluted section may be located remote from the distal end of the drill, for example when the drill is a so-called profile drill. Such drills are used to shape the coronal opening of the bore hole in order to better match the implant shape. As these drills are only required to cut into the bone in this coronal area they will often comprise a non-cutting guide portion distal of the fluted section, which assists with the correct orientation of the drill within the bore hole.

The drill can have any shape known in the art. For example, the shaft may be cylindrical or it may taper radially inwards or outwards in the proximal direction. The fluted section may comprise step changes in diameter. The drill may comprise a plurality of fluted sections that follow consecutively or spaced from one another. When the drill comprises a plurality of fluted sections the method of the present invention can be applied to one or more of these fluted sections. In order to achieve the best results the method of the present invention should be applied to all areas of the fluted section(s) which will comprise visual markings.

The method of the present invention is preferably applied to a dental drill for use in dental implant surgery, such as a pilot drill, twist drill, profile drill, tap etc.

The method of the present invention is preferably applied to a metal drill, most preferably a stainless steel drill, as this metal responds particularly well to both acid etching and electro-polishing. Particularly preferred stainless steels are hardened stainless steels such as 1.4108 Cronidur.

Viewed from another aspect the present invention provides a dental drill produced according to the above described method. A drill subjected to the surface treatment method of the present invention will show a distinctive surface pattern of "smoothed peaks" under a microscope, for example a scanning electron microscope (SEM), as seen for example in FIG. 5C below.

A preferred method for viewing the smoothed peaks created by the method of the present invention is using the SED (secondary electron detector) of an SEM at a magnification of 10,000 or greater, most preferably between 10,000 and 20,000 magnification. Any commercially available SEM can be used, for example Zeiss Supra® 55 or Phenom XL Desktop.

The inventive concept described above is not limited to any particular shape or function of the drill, only to the surface treatment of those areas of the fluted section(s) which will be provided with visual markings, as described above.

Preferred embodiments of the present invention shall now be described, by way of example only, in which.

Figure 1:
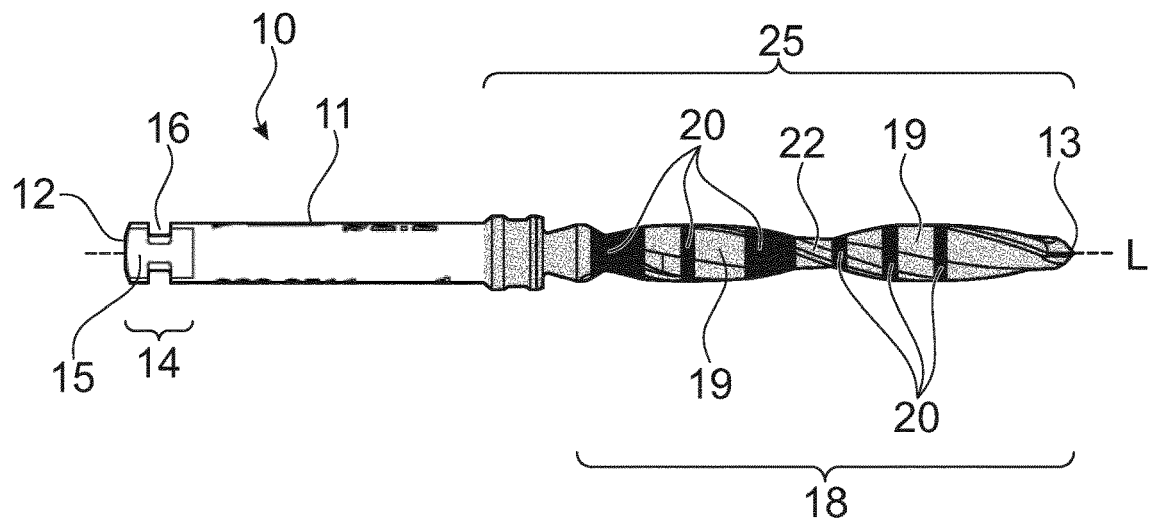
FIG. 1 shows a dental drill to which the method of the present invention has been applied.

FIG. 1 shows a drill 10 suitable for creating a bore hole in the human jaw bone. The drill comprises a shaft 11 extending along a central longitudinal axis L from a proximal end 12 to a distal end 13. A shank 14 is located at the distal end 12 of the shaft 11. The shank 14 is shaped to allow the drill 10 to be connected to a rotary drive tool, e.g. a dental handpiece. In the present embodiment the shank 14 comprises a beveled surface 15 extending in a plane parallel to the central longitudinal axis L and a groove 16 extending around the circumference of the shaft 11. Beveled surface 15 enables torque to be transmitted to the drill 10, thus driving the drill's rotation, while groove 16 enables the shank 14 to be axially fixed to the rotary drive tool.

Distal of the shank 14 the drill 10 comprises a fluted section 18. In the present embodiment the fluted section 18 extends from the distal end 13 of the drill 10 towards the shank 14. The fluted section comprises two flutes 19, which extend in a helical manner along the full length of the fluted section 18. The fluted section further comprises a plurality of axially discrete visual markings 20. Each visual marking 20 is located on the exterior surface of the shaft 11 and extends continuously about the full circumference of the shaft 11 such that it extends over the surface of the flutes 19 and lands 22 between the flutes 19. Each visual marking 20 lies in a plane perpendicular to the central longitudinal axis L of the drill 10. These visual markings 20 act as depth indicators to the surgeon during use of the drill 10.

Figure 2:
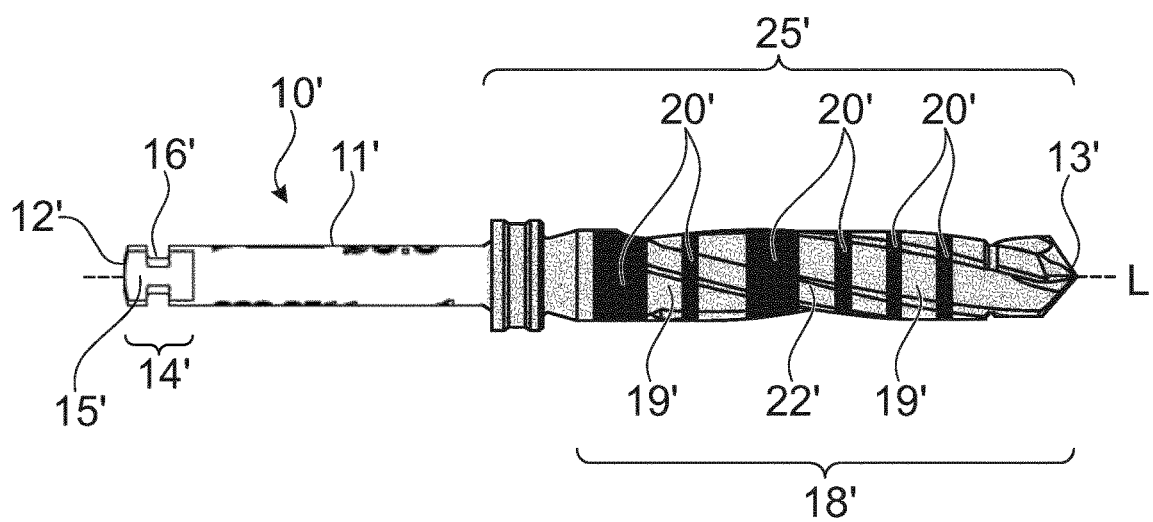
FIG. 2 shows a second dental drill to which the method of the present invention has been applied.

FIG. 2 shows a drill 10' suitable for creating a bore hole in the human jaw bone. Drill 10' is very similar to the drill of FIG. 1 and like features will be indicated with like reference numerals and the description relating to these earlier reference numerals can be applied equally to FIG. 2. Drill 10' comprises a shaft 11' extending along a central longitudinal axis L from a proximal end 12' to a distal end 13'. A shank 14' is located at the proximal end 12' of the shaft 11'.

Distal of the shank 14' the drill 10' comprises a fluted section 18'.

In contrast to drill 10, drill 10' has a larger diameter and hence fluted section 18' comprises three, as opposed to two, flutes 19' interposed by lands 22'. In addition, fluted section 18' comprises a step change in diameter 21'.

Visual markings 20, 20' are produced by laser marking the external surface of the fluted section 18, 18'. In order to increase the visibility of these markings 20, 20' without increasing the heat generated by the drills 10, 10' during use to unacceptable levels, the drills are surface treated according to the present invention.

Drills 10, 10' are first acid etched, via immersion in an acid bath at room temperature for a defined period of time, e.g. 5 minutes. In the present embodiments, in order to prevent acid etching over the full drill length, protective sleeves are used to cover the proximal part of the shaft 11, 11'. The exposed portion of the drill 25, 25' is eroded by the acid, creating a roughened surface which has a matted appearance in comparison to the original surface. This matted appearance is visible to the naked eye and thus a skilled practitioner can set and adjust the parameters of the acid etching step accordingly in order to achieve the desired effect.

After acid etching the drill is electro-polished in a further step. In this embodiment the entire drill surface is electro-polished by immersing the drill 10, 10' in an electrolyte bath and attaching this to a DC power supply. The application of voltage over the drill 10, 10' results in the dissolution of molecules from the drill surface, thus partially smoothing the peaks and troughs formed by the acid etching step. Once again, this smoothing effect creates a visual difference in the appearance of the portion of the drill surface which has been acid etched 25, 25'. The parameters of the electro-polishing, e.g. voltage, time, acid and temperature, can be adjusted in order to achieve the desired visible reduction in matting, whereby the matted effect is lessened but not removed.

Once these surface treatment steps have been carried out visual markings 20, 20' are laser marked onto the portion 25, 25' which has been acid etched and electro-polished.

Following the method steps of the present invention, the portion of the drills 10, 10' which have been acid etched and electro-polished 25, 25' have a surface topography which scatters light so as to reduce the reflective glare and enhance visibility of markers 20, 20' while at the same time reducing the roughness and therefore the friction and heat generation in comparison to a purely acid etched surface.

Figure 3:
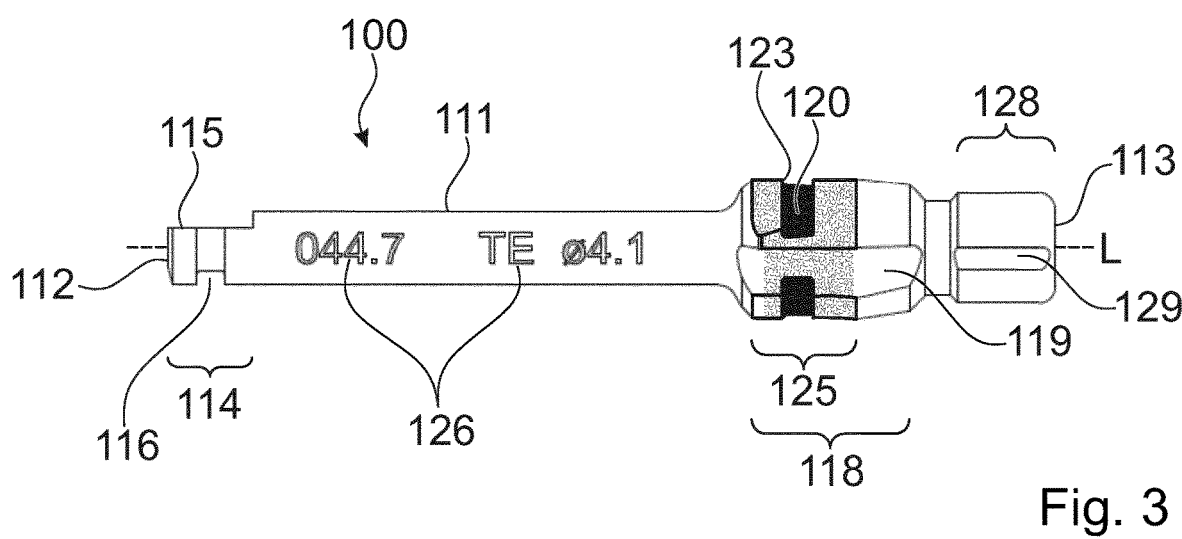
FIG. 3 shows a third dental drill to which the method of the present invention has been applied.
Figure 4:
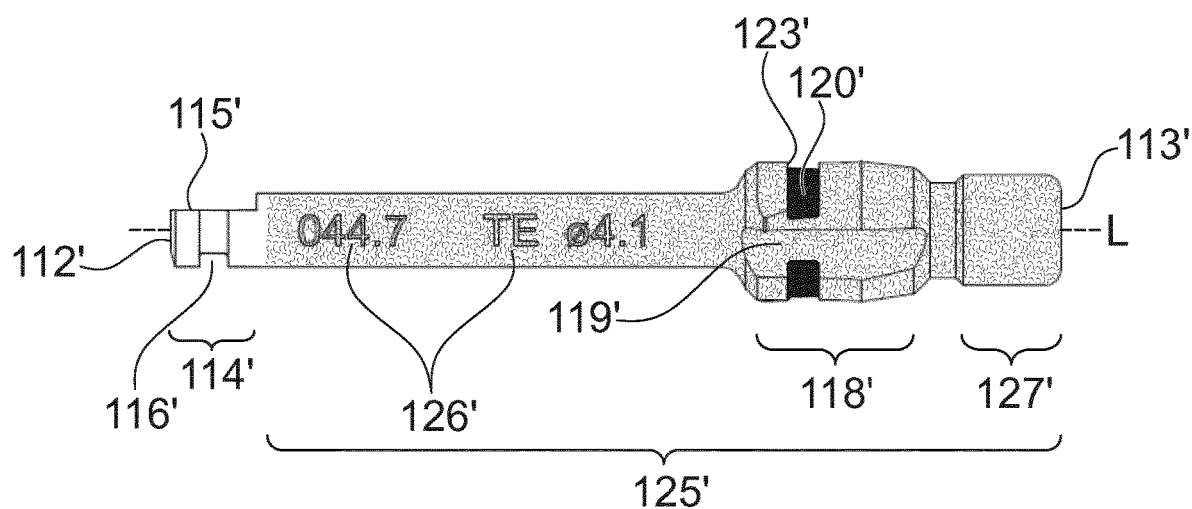
FIG. 4 shows a fourth dental drill to which the method of the present invention has been applied.

FIGS. 3 and 4 show further drills which can be surfaced treated according to the present invention.

FIG. 3 shows a profile drill 100. Such drills are used to widen and shape the coronal end of a bore hole in order to match the shape of the implant which will be inserted into the bore hole. Profile drill 100 comprises a shaft 111 extending along a central longitudinal axis L from a proximal end 112 to a distal end 113. A shank 114 is located at the distal end 112 of the shaft 111. The shank 114 is shaped to allow the drill 111 to be connected to a rotary drive tool, e.g. a dental handpiece in an identical manner to the shanks 14, 14' of FIGS. 1 and 2. Like features are indicated with like reference numerals and the description relating to these earlier reference numerals can be applied equally to FIGS. 3 and 4.

Distal of the shank 114, profile drill 100 comprises a fluted section 118. Contrary to the previous embodiments the fluted section 118 does not extend from the distal end 113 of the shaft 111. This is because, as previously mentioned, the profile drill 100 is only required to cut the coronal end portion of the bore hole. The fluted section 118 comprises two flutes 119, which extend in a straight manner along the full length of the fluted section 118. The fluted section 118 further comprises a visual marking 120. The visual marking 120 is located within a circumferential groove 123 on the shaft 111 and extends discontinuously about the circumference of the shaft 111. This embodiment therefore provides an example of a visual marking not provided on the exterior surface of the drill. The visual marking 120 lies in a plane perpendicular to the central longitudinal axis L of the drill 100. The visual marking 120 acts as a depth indicator to the surgeon during use of the drill 100.

Distal of fluted section 118, at the distal end 113 of the drill 100, a second fluted section 128 is provided. This second fluted section 128 has a smaller diameter than fluted section 118 but also comprises two flutes 129 extending in a straight manner along the full length of the second fluted section 128.

In the present embodiment the above described acid etching and electro-polishing surface treatment is applied to portion 125 of the drill 100. This embodiment therefore provides an example in which the surface treatment steps of the present invention are only applied to a portion of the fluted section 118, and further in which additional fluted sections 128 can be found on the drill 100 in which no surface treatment steps of the present invention are conducted.

Drill 100 also comprises further visual markings 126 laser printed onto the surface of the shaft 111 at a location remote from the fluted sections 118, 128. In this case these visual markings 126 provide the user with information on the drill type (diameter, shape, product number). As these visual markings only need to be referred to during the selection of the drill rather than in use, surface glare is not so problematic and therefore the surface treatment steps of the present invention have not been carried out on the area of the drill containing these markings 126.

FIG. 4 shows a further embodiment of a profile drill 100', in which many features are similar to that of the profile drill 100 of FIG. 3. Like features will be indicated with like reference numerals and where these reference numbers are not discussed in relation to FIG. 4 the equivalent description from FIG. 3 can be applied.

In contrast to FIG. 3, profile drill 100' does not comprise a second fluted portion but instead a guide portion 127' located at the distal end 113' of the shaft 111'. Furthermore, in this case, the acid etching and electro-polishing steps of the present invention have been applied over a much greater portion 125' of the drill 100'. In the present embodiment only shank 114' remains untreated, in order to prevent any potential interference with the connection of the drill 100' to the rotary driver.

FIGS. 1-4 each schematically demonstrate the visual difference in the portion 25, 25', 125, 125' of the surface which has been acid etched and electro-polished in accordance with the present invention. As discussed above, these steps have the effect of roughening and then partially smoothing the drill surface in this portion.

Figure 5A:
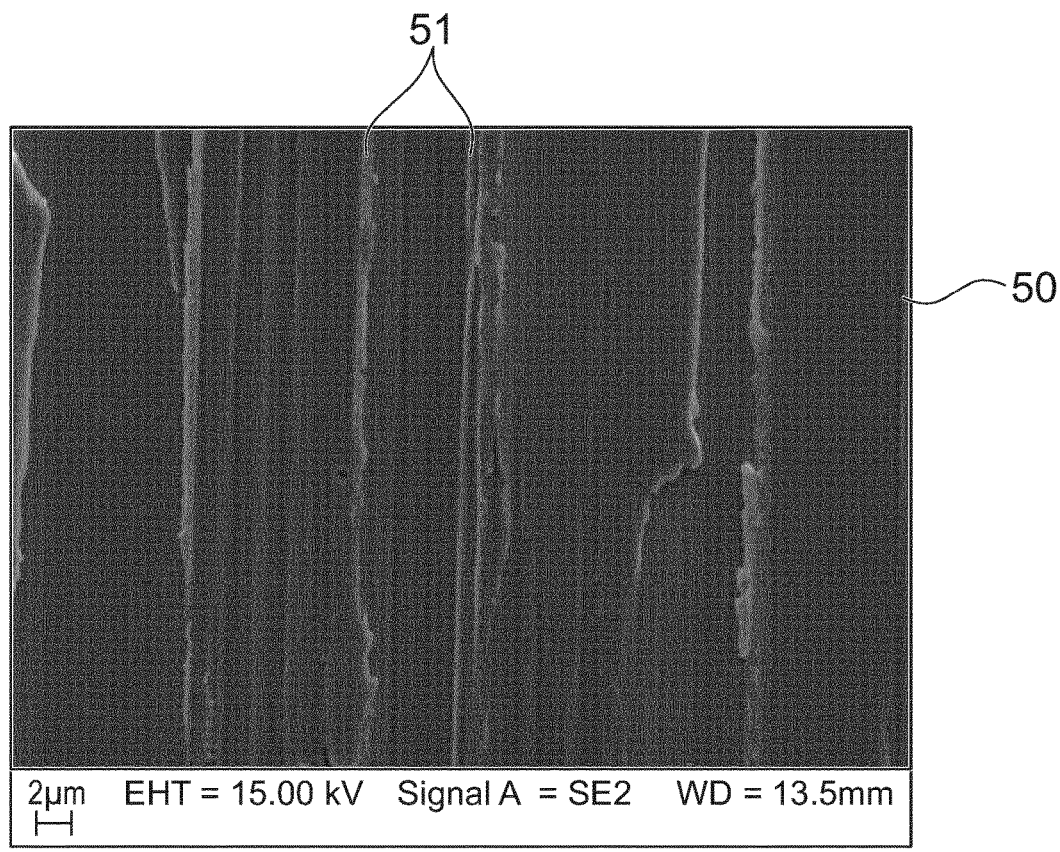
FIG. 5A shows a scanning electron microscope image of a drill surface.
Figure 5B:
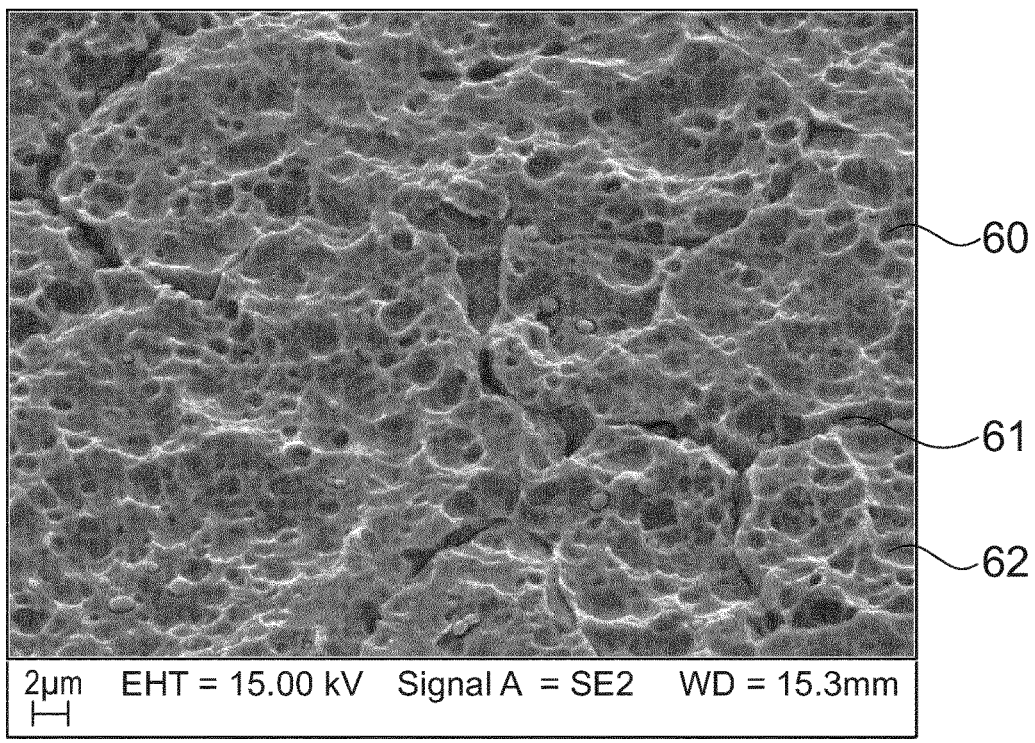
FIG. 5B shows a scanning electron microscope image of a drill surface which has been acid-etched.
Figure 5C:
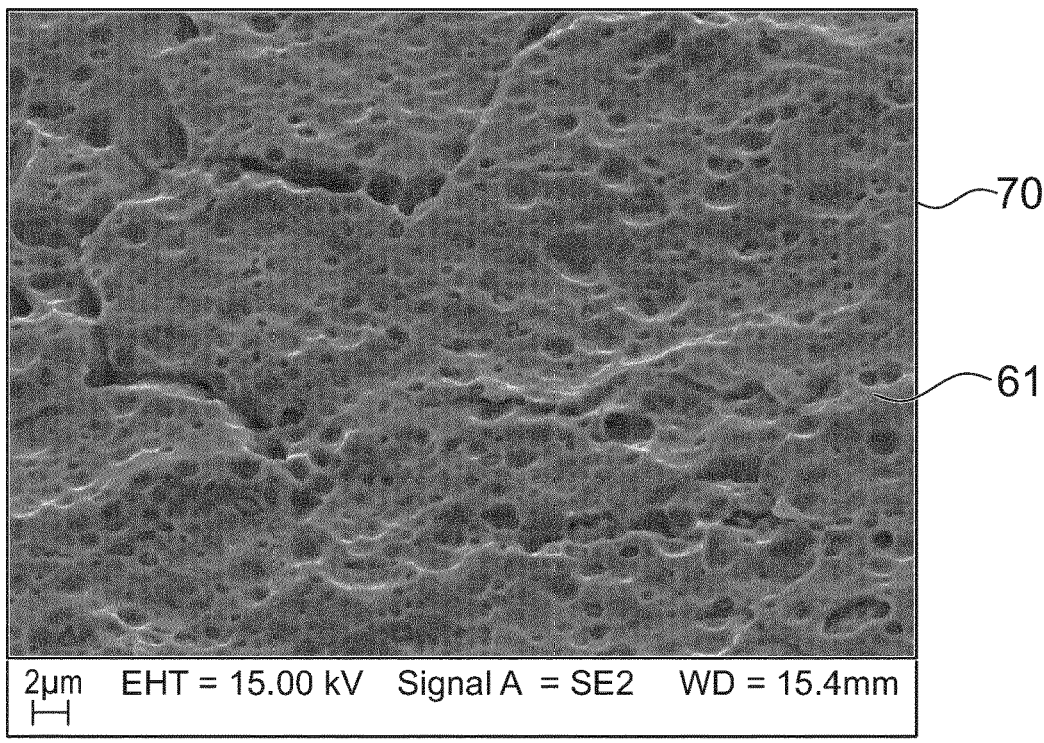
FIG. 5C shows a scanning electron microscope image of a drill surface which has been acid etched and subsequently electro-polished in accordance with the present invention.

FIGS. 5A-C are SEM images which show in detail the effects of the inventive method on the drill surface.

FIG. 5A shows an untreated drill surface 50. This surface is very smooth and shows only machining marks 51 caused by the milling of the drill.

FIG. 5B shows the drill surface 60 after the acid etching step. Here a large number of peaks 61 and troughs 62 can be seen. These surface features are microscopic in scale, i.e. the troughs and ridges predominantly have widths and heights measuring 1 to several micrometres.

FIG. 5C shows the drill surface 70 after a subsequent electro-polishing step. A comparison with FIG. 5B shows that the peaks 61 have been significantly reduced in height as well as rounded.

These differences in the surface, shown here in a microscopic scale, are detectable to the naked eye as a difference in texture. Thus, a skilled person can detect the change in matting caused by electro-polishing the acid etched surface in order to achieve the reduced matted effect of the present invention.

In addition, the particular rounded or smoothed peaks 61 of the type seen for example in FIG. 5C are uniquely linked to the surface treatment method of the present invention. A skilled person viewing the drill under, e.g., an SEM microscope will therefore be able to determine whether the drill was surface treated by a combination of acid etching and subsequent electro-polishing.

Figure 6A:
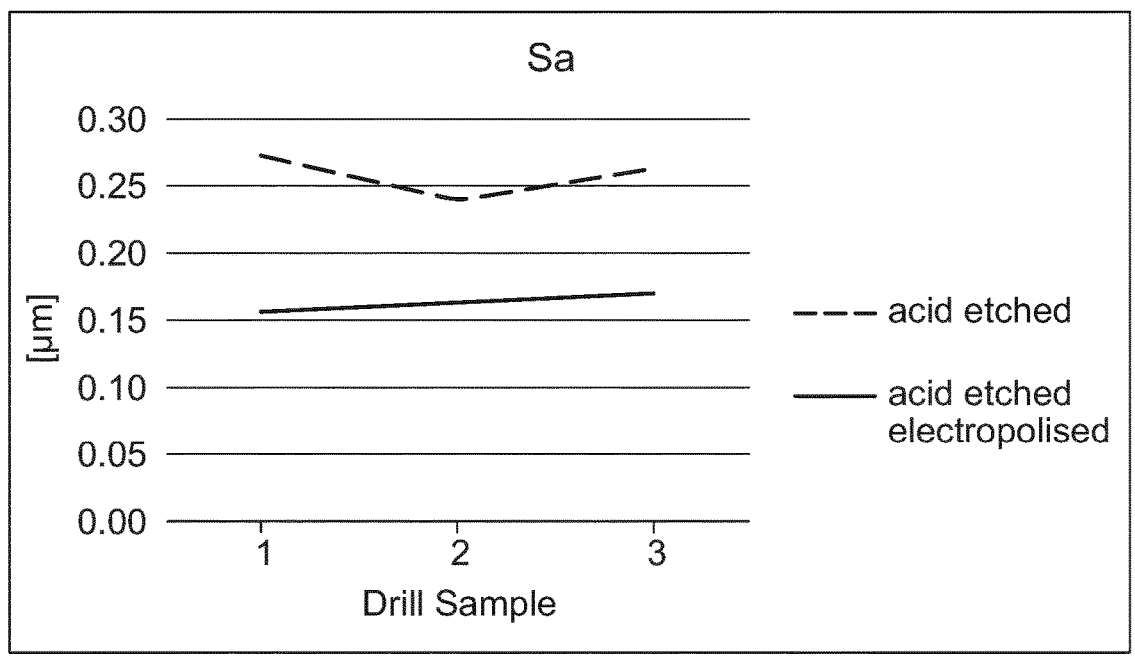
FIG. 6A shows a graph comparing the Sa values of acid etched drills in comparison to drills treated in accordance with the present invention.
Figure 6B:
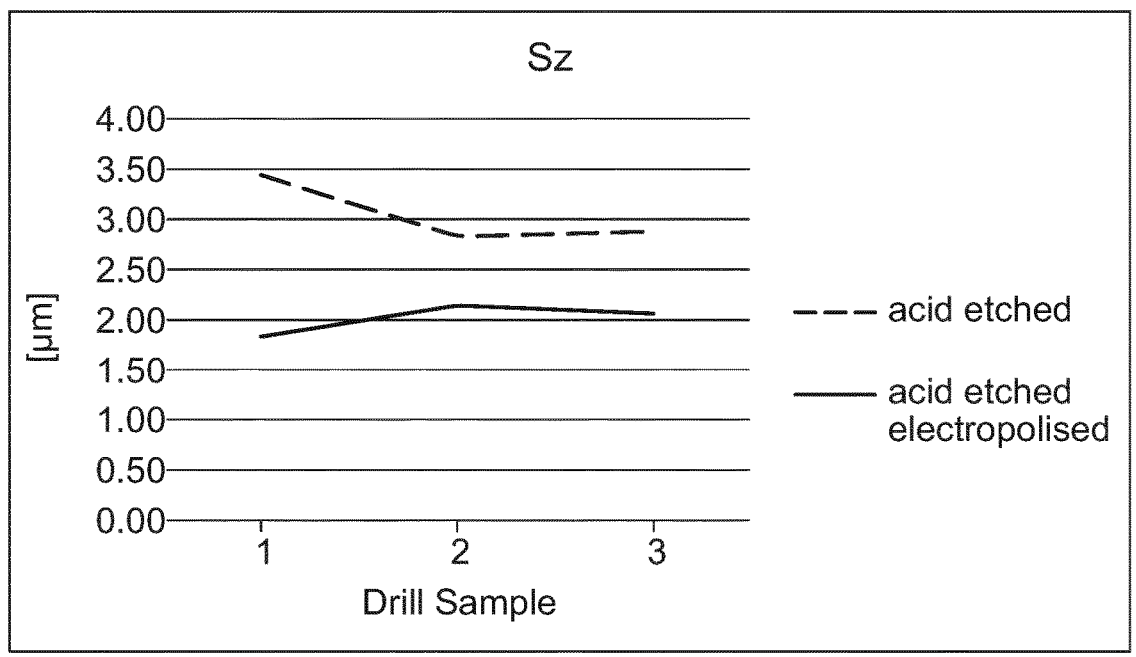
FIG. 6B shows a graph comparing the Sz values of acid etched drills in comparison to drills treated in accordance with the present invention.

The difference in roughness between a purely acid etched surface and an acid etched and electro-polished surface can also be seen in surface roughness measurements. FIGS. 6A and 6B show graphs of Sa and Sz measurements respectively. These measurements were made on 6 drills, all of which were acid etched using the same method and three were further electro-polished according to the method of the present invention. As can be seen in FIGS. 6A and 6B, both the roughness values Sa and Sz for the acid etched and electropolished drills are significantly reduced compared to the drills which have undergone acid etching only.

The above described embodiments are for illustrative purposes only and the skilled person will realize that alternative arrangements are possible which fall within the scope of the claims. For example, other geometries of drill, in particular flute design can be employed. The visual markings could be formed by methods other than laser marking, e.g. painting, and be intended for purposes other than depth indicators. The exact surface topography and surface roughness of the treated portion of the drills can vary while still falling within the scope of the claims.

The invention claimed is:

1. A method of surface treating a drill,
said drill comprising a shaft extending along a central longitudinal axis from a proximal end to a distal end, the proximal end of the shaft comprising a shank adapted for connection to a rotary driver, the shaft further comprising, distal of the shank, a fluted section comprising at least one flute extending along the longitudinal length of the fluted section,
the method comprising the steps of:
acid etching at least a portion of the fluted section of the shaft in order to create a visible matted effect,
subsequently electro-polishing at least said portion of the fluted section of the shaft in order to visibly reduce said matted effect and
subsequently creating one or more visual marking within said portion of the fluted section of the shaft.

2. The method as claimed in claim 1, wherein the acid etching step provides a roughened surface including a micro-roughness with microscopic peaks and troughs, and wherein the electro-polishing step smooths the micro-roughness caused by the acid etching but not to such an extent that the roughness is removed entirely.

3. The method as claimed in claim 1, wherein after the electro-polishing step, the average surface roughness Sa of the portion of the drill which has been acid etched and electro-polished is between 0.1 and 0.2 µm and the maximum height surface roughness Sz of the portion of the drill which has been acid etched and electro-polished is between 1.0 and 2.5 µm.

4. The method as claimed in claim 3, wherein after the acid etching step but prior to the electro-polishing step, the average surface roughness Sa of the portion of the drill which has been acid etched is between 0.2 and 0.3 µm and the maximum height surface roughness Sz of the portion of the drill which has been acid etched is between 2.5 and 4.0 µm.

5. The method as claimed in claim 1, wherein the one or more visual marking is formed by laser marking.

6. The method as claimed in claim 5, wherein the one or more visual marking is formed by laser marking the exterior surface of the shaft of the drill.

7. The method as claimed in claim 1, wherein the one or more visual marking extends circumferentially about the shaft.

8. The method as claimed in claim 7, wherein the one or more visual marking extends in a continuous manner about the full circumference of the shaft.

9. The method as claimed in claim 1, wherein the one or more visual marking extends circumferentially about the shaft in a plane perpendicular to the central longitudinal axis of the shaft.

10. The method as claimed in claim 1, wherein a plurality of visual markings are formed at discrete axial distances from one another within one or more portions of the fluted section which have been acid etched and subsequently electro-polished.

11. The method as claimed in claim 1, wherein at least the entire fluted section is acid etched and subsequently electro-polished.

12. The method as claimed in claim 1, wherein the acid etching step is carried out from the distal end of the drill to a point proximal of the fluted section but distal of the shank while the subsequent electro-polishing step is carried out over the full length of the drill.

13. The method as claimed in claim 1, wherein the fluted section extends from the distal end of the drill towards the shank.

14. The method as claimed in claim 1, wherein the fluted section comprises a plurality of flutes, which extend along the fluted section in a helical manner.

15. The method as claimed in claim 1, wherein the drill is a metal drill for use in dental implant surgery.

16. The method as claimed in claim 14, wherein the plurality of flutes contains between 2 and 4 flutes.

17. The method as claimed in claim 1, wherein the electro-polishing smooths peaks caused by the acid etching and provides an electro-polished surface with smoothed peaks and one or more visual marking, the smoothed peaks being observable using a secondary electron detector of a scanning electron microscope at a magnification of 10,000 or greater.

* * * * *